(12) United States Patent
Basso et al.

(10) Patent No.: US 7,697,536 B2
(45) Date of Patent: Apr. 13, 2010

(54) NETWORK COMMUNICATIONS FOR OPERATING SYSTEM PARTITIONS

(75) Inventors: Claude Basso, Raleigh, NC (US); Jean Louis Calvignac, Raleigh, NC (US); Chih-jen Chang, Apex, NC (US); Philippe Damon, Raleigh, NC (US); Ronald Edward Fuhs, Rochester, MN (US); Natarajan Vaidhyanathan, Carrboro, NC (US); Fabrice Jean Verplanken, La Gaude (FR); Colin Beaton Verrilli, Apex, NC (US); Scott Michael Willenborg, Stewartville, MN (US); Kyle A. Lucke, Rochester, MN (US); Harvey G. Kiel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 11/097,051

(22) Filed: Apr. 1, 2005

(65) Prior Publication Data

US 2006/0221961 A1 Oct. 5, 2006

(51) Int. Cl.
*H04L 12/56* (2006.01)
(52) U.S. Cl. .................................. 370/394; 370/360
(58) Field of Classification Search ................ 370/392, 370/254, 351, 400, 390, 410, 389, 401, 395, 370/60, 394; 709/250, 230; 711/114, 1; 365/200; 718/102
See application file for complete search history.

(56) References Cited

U.S. PATENT DOCUMENTS

| | | | |
|---|---|---|---|
| 1,724,198 A | 8/1929 | Hauser | |
| 4,825,406 A | 4/1989 | Bean et al. | |
| 5,058,110 A | 10/1991 | Beach et al. | |
| 5,172,371 A * | 12/1992 | Eng et al. | 370/411 |
| 5,359,659 A | 10/1994 | Rosenthal | |
| 5,430,842 A | 7/1995 | Thompson et al. | |
| 5,442,802 A | 8/1995 | Brent et al. | |
| 5,752,078 A | 5/1998 | Delp et al. | |
| 5,983,274 A * | 11/1999 | Hyder et al. | 709/230 |

(Continued)

FOREIGN PATENT DOCUMENTS

WO 03049488 A1 6/2003

OTHER PUBLICATIONS

Kung, H.T., Gigabit Local Area Networks: A System Perspective, Apr. 1992, IEE Communications Magazine, vol. 30, Issue 4, pp. 79-89.

(Continued)

*Primary Examiner*—Kwang B Yao
*Assistant Examiner*—Syed Bokhari
(74) *Attorney, Agent, or Firm*—Jason Piche; Jeffrey L. Streets

(57) ABSTRACT

Providing communications between operating system partitions and a computer network. In one aspect, an apparatus for distributing network communications among multiple operating system partitions includes a physical port allowing communications between the network and the computer system, and logical ports associated with the physical port, where each logical port is associated with one of the operating system partitions. Each of the logical ports enables communication between a physical port and the associated operating system partition and allows configurability of network resources of the system. Other aspects include a logical switch for logical and physical ports, and packet queues for each connection and for each logical port.

17 Claims, 10 Drawing Sheets

U.S. PATENT DOCUMENTS

| | | | |
|---|---|---|---|
| 5,991,299 | A | 11/1999 | Radogna et al. |
| 6,041,058 | A | 3/2000 | Flanders et al. |
| 6,266,700 | B1 | 7/2001 | Baker et al. |
| 6,400,730 | B1 | 6/2002 | Latif et al. |
| 6,427,169 | B1 | 7/2002 | Elzur |
| 6,650,640 | B1 | 11/2003 | Muller et al. |
| 6,658,002 | B1 | 12/2003 | Ross et al. |
| 6,678,746 | B1 | 1/2004 | Russell et al. |
| 6,724,769 | B1 | 4/2004 | Sang |
| 6,728,929 | B1 | 4/2004 | Luong |
| 6,735,670 | B1 | 5/2004 | Bronstein et al. |
| 6,751,229 | B1 | 6/2004 | Waller et al. |
| 6,754,662 | B1 | 6/2004 | Li |
| 6,788,697 | B1 | 9/2004 | Aweya et al. |
| 6,795,870 | B1 | 9/2004 | Bass et al. |
| 6,822,968 | B1 | 11/2004 | Lim |
| 6,937,574 | B1 * | 8/2005 | Delaney et al. ............. 370/254 |
| 6,954,463 | B1 | 10/2005 | Ma et al. |
| 6,970,419 | B1 | 11/2005 | Kalkunte et al. |
| 6,976,205 | B1 | 12/2005 | Ziai et al. |
| 6,988,235 | B2 | 1/2006 | Brown |
| 7,023,811 | B2 * | 4/2006 | Pinto .......................... 370/254 |
| 7,031,304 | B1 * | 4/2006 | Arberg et al. ............... 370/360 |
| 7,062,570 | B2 | 6/2006 | Hong et al. |
| 7,098,685 | B1 | 8/2006 | Agrawal et al. |
| 7,124,198 | B2 | 10/2006 | Pinkerton |
| 7,131,140 | B1 | 10/2006 | O'Rourke et al. |
| 7,134,796 | B2 | 11/2006 | Anderson |
| 7,164,678 | B2 | 1/2007 | Connor |
| 7,218,632 | B1 | 5/2007 | Bechtolsheim et al. |
| 7,251,704 | B2 | 7/2007 | Solomon |
| 7,260,120 | B2 | 8/2007 | Kang et al. |
| 7,269,661 | B2 | 9/2007 | Ree et al. |
| 7,271,706 | B2 | 9/2007 | Lee et al. |
| 7,274,706 | B1 | 9/2007 | Nguyen et al. |
| 7,283,528 | B1 | 10/2007 | Lim et al. |
| 7,286,557 | B2 | 10/2007 | Feuerstraeter et al. |
| 7,292,586 | B2 | 11/2007 | Dewan et al. |
| 7,292,591 | B2 | 11/2007 | Parker et al. |
| 7,295,553 | B2 | 11/2007 | Saitoh |
| 7,298,761 | B2 | 11/2007 | Hong |
| 7,308,006 | B1 | 12/2007 | Banerjee et al. |
| 7,349,399 | B1 * | 3/2008 | Chen et al. .................. 370/394 |
| 7,360,217 | B2 * | 4/2008 | Melvin et al. ............... 718/102 |
| 7,366,194 | B2 | 4/2008 | Yu et al. |
| 2001/0027496 | A1 | 10/2001 | Boucher et al. |
| 2002/0048270 | A1 | 4/2002 | Allen et al. |
| 2003/0026252 | A1 | 2/2003 | Thunquest et al. |
| 2003/0088689 | A1 | 5/2003 | Alexander et al. |
| 2003/0103499 | A1 | 6/2003 | Davis et al. |
| 2003/0154399 | A1 | 8/2003 | Zuk et al. |
| 2003/0227920 | A1 * | 12/2003 | Benayoun et al. ........... 370/392 |
| 2004/0022094 | A1 * | 2/2004 | Radhakrishnan et al. .... 365/200 |
| 2004/0030766 | A1 | 2/2004 | Witkowski |
| 2004/0064590 | A1 * | 4/2004 | Starr et al. .................. 709/250 |
| 2004/0081145 | A1 | 4/2004 | Harrekilde-Peterson et al. |
| 2004/0100952 | A1 | 5/2004 | Boucher et al. |
| 2004/0109465 | A1 | 6/2004 | Kim et al. |
| 2004/0128398 | A1 | 7/2004 | Pettey |
| 2004/0177275 | A1 | 9/2004 | Rose et al. |
| 2004/0218623 | A1 | 11/2004 | Goldenberg et al. |
| 2005/0022017 | A1 | 1/2005 | Maufer et al. |
| 2005/0076136 | A1 | 4/2005 | Cho et al. |
| 2005/0089031 | A1 | 4/2005 | Krueger |
| 2005/0108611 | A1 | 5/2005 | Vogt |
| 2005/0114663 | A1 | 5/2005 | Cornell et al. |
| 2005/0120160 | A1 * | 6/2005 | Plouffe et al. .................. 711/1 |
| 2005/0149677 | A1 * | 7/2005 | Shimada et al. ............. 711/114 |
| 2005/0174153 | A1 | 8/2005 | Saeki |
| 2005/0256975 | A1 | 11/2005 | Kaniz et al. |
| 2006/0031600 | A1 | 2/2006 | Ellis et al. |
| 2006/0120289 | A1 | 6/2006 | Cunningham |
| 2006/0187928 | A1 * | 8/2006 | McGee et al. ............... 370/390 |
| 2006/0216958 | A1 | 9/2006 | Yee et al. |

OTHER PUBLICATIONS

Cunningham, D.G., The Status of the 10-Gigabit Ethernet Standard, 2001, 27th European Conference on Optical Communication, 2001. ECOC '01, vol. 3, pp. 364-367.

IP Com, Reusing a 10Gbps Ethernet Media Access Controller for a 1Gbps/100Mbps Ethernet, located at www.ip.com, IP.com No. IPCOM000133402D, Jan. 25, 2006, 6 pages.

Adolf, Geier, Patent Cooperation Treaty: PCT Notification of transmittal of the International Preliminary Report on Patentability (PCT Rule 71.1), European Patent Office, Apr. 13, 2007, 7 pages.

Rummery, Audrey, Patent Cooperation Treaty: PCT Notification of Transmittal of the International Search Report and the Written Opinion of the International Searching Authority, or the Declaration (PCT Rule 44.1), European Patent Office, Jul. 5, 2006, 11 pages.

Braden, Computing the Internet Checksum, RFC 1071, Sep. 1988.

Rijsinghani, Computing the Internet Checksum via Incremental Update, RFC 1624, May 1994.

Touch, Implementing the Internet Checksum in Hardware, RFC 1936, Apr. 1996.

Mazzucco, The Fundamentals of Cache, SystemLogic.Net, Oct. 17, 2000.

Balena, F., "Speed up searched with hash tables," Nov. 13, 2001, DevX.com all pages.

Acayan, Joseph, "Facsimile Transmital", Apr. 22, 2008, Sayer Law Group, LLP, 1 page.

* cited by examiner

NETWORK COMMUNICATIONS FOR OPERATING SYSTEM PARTITIONS

CROSS-REFERENCE TO RELATED APPLICATIONS

The present application is related to the following copending U.S. patent applications:

U.S. patent application Ser. No. 11/097,608, entitled "Host Ethernet Adapter for Networking Offload in Server Environment", filed on even date herewith and assigned to the assignee of the present invention.

U.S. patent application Ser. No. 11/096,363, entitled "Method and System for Accommodating Several Ethernet Ports and a Wrap Transmitted Flow Handled by a Simplified Frame-By-Frame Upper Structure", filed on even date herewith and assigned to the assignee of the present invention.

U.S. patent application Ser. No. 11/096,571, entitled "Method and Apparatus for Providing a Network Connection Table", filed on even date herewith and assigned to the assignee of the present invention.

U.S. patent application Ser. No. 11/097,652, entitled "Configurable Ports for a Host Ethernet Adapter", filed on even date herewith and assigned to the assignee of the present invention.

U.S. patent application Ser. No. 11/096,365, entitled "System and Method for Parsing, Filtering, and Computing the Checksum in a Host Ethernet Adapter (HEA)", filed on even date herewith and assigned to the assignee of the present invention.

U.S. patent application Ser. No. 11/096,353, entitled "System and Method for a Method for Reducing Latency in a Host Ethernet Adapter (HEA)", filed on even date herewith and assigned to the assignee of the present invention.

U.S. patent application Ser. No. 11/097,055, entitled "Method and Apparatus for Blind Checksum and Correction for Network Transmissions", filed on even date herewith and assigned to the assignee of the present invention.

U.S. patent application Ser. No. 11/096,362, entitled "Method and System for Performing a Packet Header Lookup", filed on even date herewith and assigned to the assignee of the present invention.

U.S. patent application Ser. No. 11/097,430, entitled "System and Method for Computing a Blind Checksum in a Host Ethernet Adapter (HEA)", filed on even date herewith and assigned to the assignee of the present invention.

FIELD OF THE INVENTION

The present invention relates to communication in computer networks, and more particularly to communications between operating system partitions and computer networks.

BACKGROUND OF THE INVENTION

Computer systems communicate with each other over networks by establishing and using network connections using well known standards such as Ethernet. Typically, multiple entities or processes running on a system can each independently communicate over the network. To help enable efficient communication over multiple connections to a system, network ports are provided for the input and output of the system. For example, a system might include a network adapter interface card that includes one or more physical ports to the network.

Some computer systems allow multiple operating systems (OS's) to be running concurrently and independently. For example, some server systems from IBM Corporation run multiple operating systems by providing each operating system in its own partition on the server. For example, a Linux partition, an AIX partition, and a different Unix partition can be running simultaneously on a server. To allow all these OS partitions to communicate over the network, different methods can be used. In one method, an I/O hosting partition of the server must handle the communication needs of all of the partitions running on the system. This creates slower communications to the OS partitions, however, because the multiple partitions are bottlenecked in their I/O communications over a network though the single I/O hosting partition, e.g., each partition must forward and receive its data through the single I/O hosting partition that includes a packet forwarder that is connected to a single network adapter.

In another configuration, to allow faster communication, a network adapter and physical network port can be provided to each OS partition on the same machine. Thus, for example, each of five different OS partitions is provided with its own dedicated network adapter with a physical port. However, the expense of such a configuration can become excessive, especially when a larger number of OS partitions is being implemented.

Having multiple OS partitions running on a system also requires that information received by the system and sent by the system is routed to all appropriate network destinations, and that partitions are able to send to and receive information from other partitions running on the same server. Other OS partitions might be designated as a sole destination for a data packet, or could be included in a group of several destinations for a packet. For example, broadcast (BC) and multicast (MC) network functions over Ethernet networks allow multiple destinations to receive information sent by a particular system or partition. If one partition sends out broadcast information to all available destinations on the network, then all of the other OS partitions on the system need to receive the broadcast information.

In existing systems network traffic is provided to and from different OS partitions by using any of several available methods. In one method, layer 3 routing is performed though a router external to the server system, where all data packets are sent outside the system and back into the system to appropriate OS partitions. However, this can be inefficient due to the external path, which takes longer, and may not support all desired functionality, such as layer 2 protocol support. In another method, a full Ethernet switch can be embedded on a network adapter. The switch switches between different partitions as needed to provide packets to the appropriate destinations. However, this method is expensive, since the Ethernet switch is external to existing circuitry on the adapter, and also may require non-standard, custom features and functionality.

Another network communication issue for server systems involves queuing of data packets. Traditionally, a single queue is provided for storing data packets that are sent out from or received by an operating system, where a stack in the kernel of the operating system handles the packets in the queue. In some other systems, other types of queuing may be used. However, the existing queuing methods do not address the needs of a system having multiple partitions, or the possibility of having both user-space queues as well as OS kernel queues.

Accordingly, what is needed is an apparatus and method for efficiently and inexpensively communicating with operating system partitions and computer networks, including the use of multiple OS partitions on a computer system with a limited number of physical ports, configurable line speeds, an efficient way to assign resources, and different kinds of packet queues. The present invention addresses such a need.

SUMMARY OF THE INVENTION

The invention of the present application relates to communication in computer networks, and between operating system partitions and computer networks. In one aspect of the invention, an apparatus for distributing network communications among multiple operating system partitions provided on a computer system includes at least one physical port coupled to a network, the physical port allowing communications between the network and the computer system. Logical ports associated with the at least one physical port are included, where each of the logical ports is associated with one of the operating system partitions. Each of the logical ports enables communication of information between the associated physical port and the associated operating system partition and allows configurability of network resources of the system.

In another aspect of the invention, a method for distributing network communications among multiple operating system partitions provided on a computer system includes communicating information between an operating system partition and at least one logical port associated with the operating system partition. Each one of multiple operating system partitions can communicate with associated at least one logical ports. The method also includes communicating the information between the at least one logical port associated with the operating system partition and at least one physical port associated with the at least one logical port, where the physical port is coupled to a network.

In another aspect of the present invention, a method for distributing network communications on a computer system includes receiving a data packet at a logical switch in the computer system, the computer system running multiple operating system partitions. The data packet is wrapped from one operating system partition of the computer system to another operating system partition of the computer system through a hardware path internal to the computer system when information in the packet indicates a wrap path. The data packet, if received from an operating system partition, is sent to a physical port coupled to an external network, or if received from the external network, is sent to an operating system partition, when information in the data packet indicates a non-wrap path.

In another aspect of the present invention, an apparatus for distributing network communications among multiple operating system partitions provided on a computer system includes at least one physical port coupled to an external network, the physical port allowing communications between the external network and the computer system. Included logical ports are each associated with one of the operating system partitions. A logical switch implemented internally to the computer system selects the physical port and the logical ports and enables communication of information to the operating system partitions and the physical port.

In another aspect of the present invention, an apparatus for providing network communications for a computer system includes at least one physical port coupled to a network, the physical port allowing communications between the network and the computer system. Multiple connection queues are included for storing data packets that are to be sent from or received by at least one process in at least one user space of the computer system, where each connection queue is associated with a different network connection between one of the at least one processes and the network. A default operating system queue is also included for storing data packets that are to be sent from or received by a kernel of an operating system partition implemented by the computer system.

In another aspect of the present invention, a method for providing network communications for a computer system includes receiving a data packet at a network adapter. The data packet is stored in a connection queue, where the connection queues stores data packets that are to be sent from or received by at least one process in at least one user space of the computer system via associated network connections. The data packet is stored in a default operating system queue if no network connection can be found for the data packet. where the default operating system queue stores data packets that are to be sent from or received by a kernel of an operating system partition implemented by the computer system.

The present invention allows fast and efficient communications to multiple operating system (OS) partitions provided on server system. Using a network adapter of the present invention, transparent to the software, the same performance can be achieved as if each partition had its own dedicated Ethernet adapter, without having to supply an adapter for every partition, and using standard adapter hardware. Logical switches of the present invention allow data packets of all types, including unicast, broadcast, and multicast packets, to be efficiently provided to network and OS partitions, and the packet queues of the present invention permit multiple types of queuing to be supported, e.g., in a system having multiple OS partitions. The invention provides an efficient way to virtualize an Ethernet or similar network, assign resources, and configure line speeds and other resources.

DETAILED DESCRIPTION

The present invention relates to communication in computer networks, and more particularly to communications between operating system partitions and computer networks. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of systems provided in particular implementations. However, one of ordinary skill in the art will readily recognize that this method and system will operate effectively in other implementations. For example, the system architectures and network configurations usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1 through 10 in conjunction with the discussion below. The present invention is described in the context of IEEE 802.3 Ethernet network protocol and Transmission Control Protocol/Internet Protocol (TCP/IP) client-server system. Other protocols (such as User Datagram Protocol (UDP)) and configurations can be used in other embodiments (e.g., UDP 5-tuples could be mapped to queues).

Figure 1:
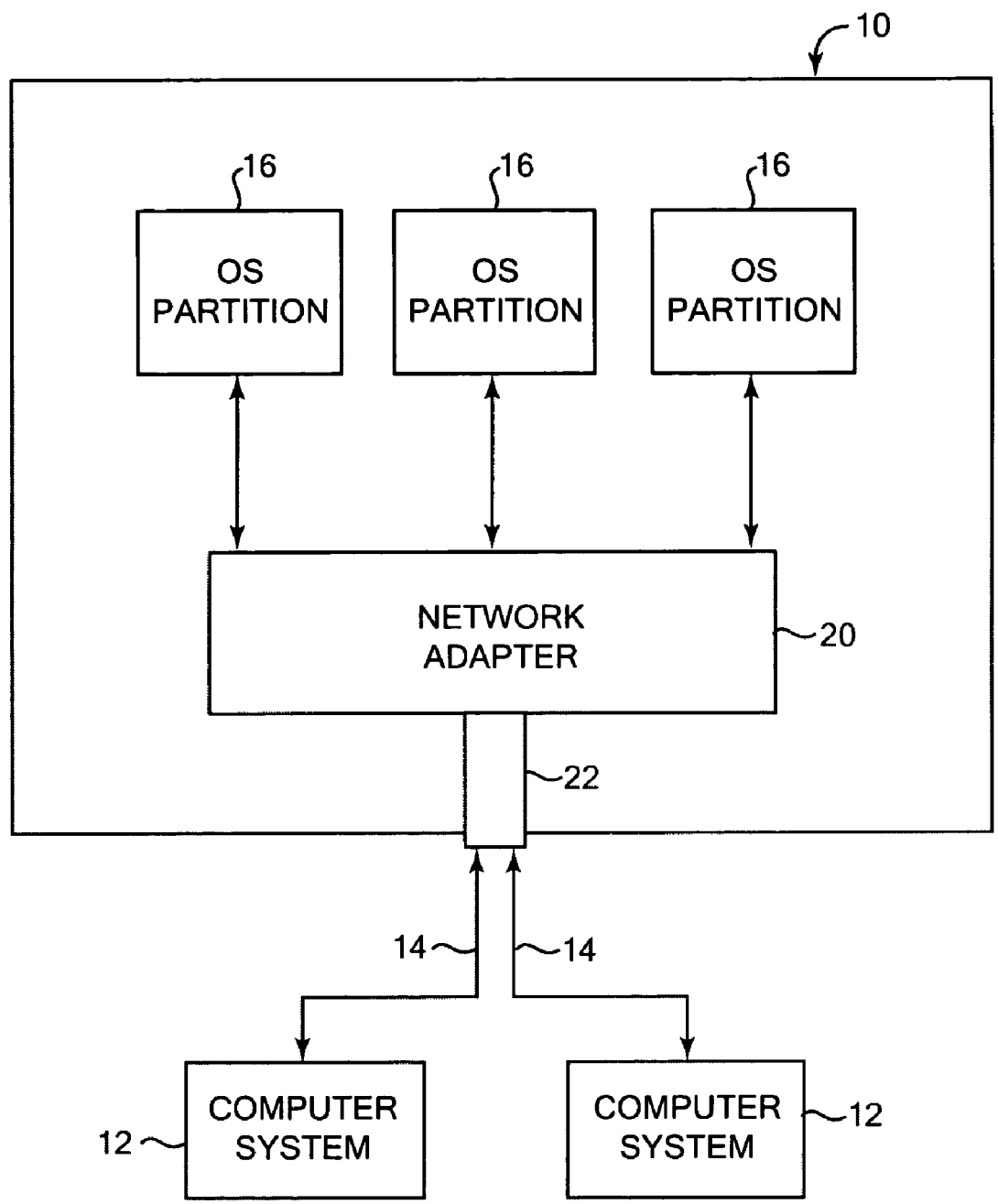
FIG. 1 is a block diagram of an example of a system suitable for use with the present invention.

FIG. 1 is a block diagram of a system 10 suitable for use with the present invention. System 10 is a computer system such as a server, mainframe, desktop client computer, workstation, or other computer or electronic device. In the embodiments described herein, system 10 is generally referred to as a server system. One or more microprocessors, memory (RAM and/or ROM), and other components are provided in the system 10, as is well known.

In the described embodiment, the server system 10 can communicate with various other computer systems 12 via network connections 14. The computer systems 12 can be servers, client machines, or other computer or electronic devices. For example, the server system 10 can communicate with computer systems 12 using a networking protocol such as Ethernet, TCP/IP, and/or other types of protocols.

For several of the embodiments described herein, server system 10 includes a number of operating system (OS) partitions 16. An operating system can run independently in each partition 16. For example, operating systems such as Unix, Linux, AIX from IBM Corp., Windows from Microsoft Corp., MacOS from Apple Computer, Inc., or others, can each run in a partition 16, and multiple instances of a certain type of OS can run in separate partitions 16.

Each of the OS partitions 16 can send and receive information over the network 14 and can act as a source and/or destination for data packets over the network. For example, an OS running in a partition 16 can provide server applications or processes in "user spaces", e.g., a web server application that provides web page data to computer systems 12, and/or provides database data or processes data submitted by one or more computer system 12.

Each active partition 16 sends and receives data to/from the network 14 through a network adapter 20. Adapter 20 handles providing data packets that are received over the network from computer systems 12 to appropriate OS partitions 16. The network adapter 20 also receives packets from the OS partitions 16 and controls the sending of that information to appropriate destination(s), whether that destination be a computer system 12 over the network 14, or another OS partition 16. The network adapter provides demultiplexing functions that sends appropriate data of an incoming data stream to different OS partitions. The network adapter 20 can be a hardware interface adapter that provides one or more physical ports 22 as hardware connections to the network 14. Adapter 20 can include hardware logic, microprocessors, memory (RAM and/or ROM), and/or other appropriate components to perform the functionality of the present invention as described in greater detail below. Adapter 20 can be provided as a separate card that is plugged into and removable from the server system, or can be incorporated into other server system components. In other embodiments, the functions of adapter 20 can be performed in software, or a combination of hardware and software.

An example of system components that can be used with the features of the present invention, as described throughout this specification, can be found in co-pending described in related demultiplexing patent application entitled, "Host Ethernet Adapter for a Networking Offload in a Server Environment", application Ser. No. 11/097,608, filed on Apr. 1, 2005, incorporated herein by reference in its entirety.

Figure 2:
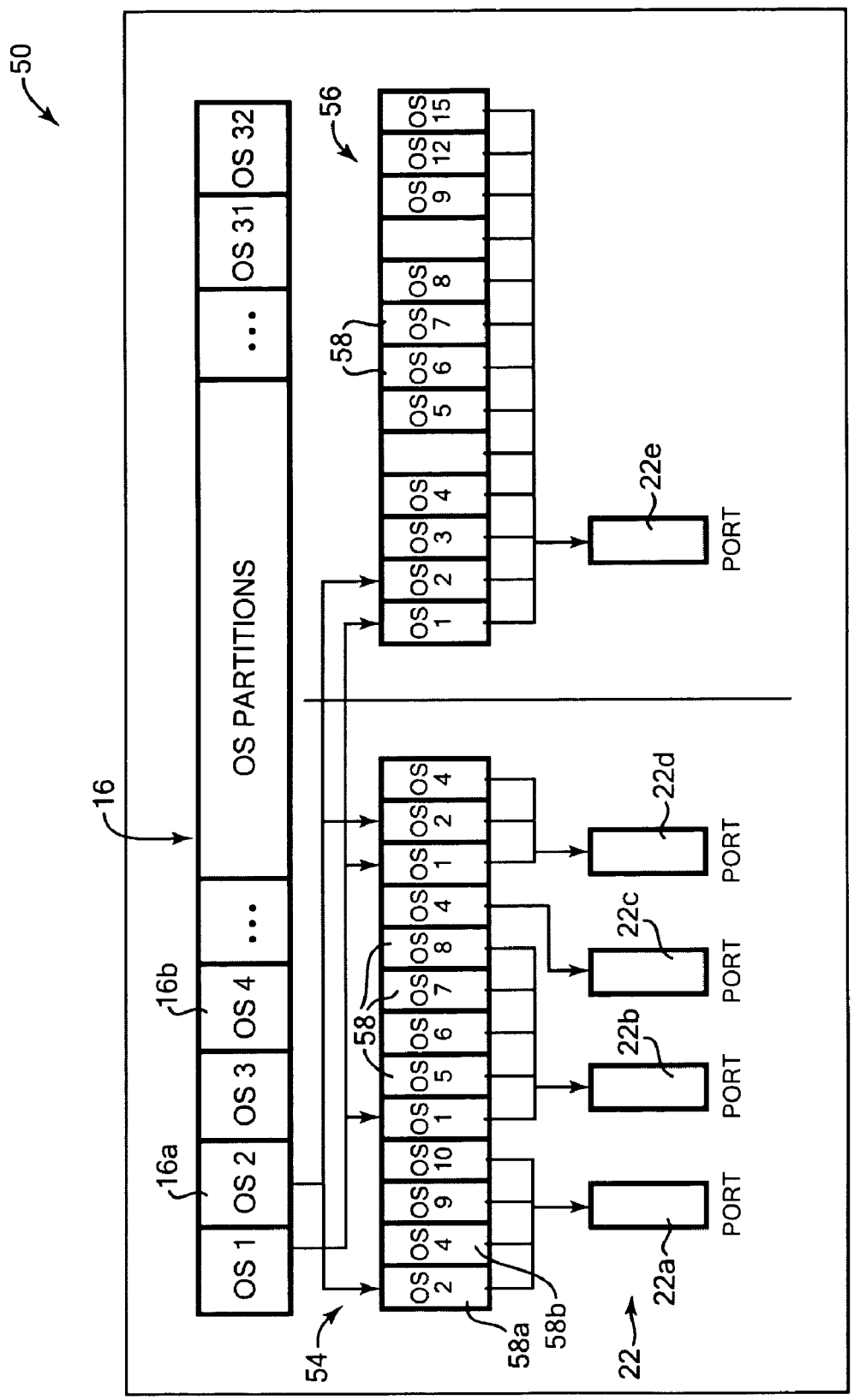
FIG. 2 is a diagrammatic illustration of a logical port system of the present invention provided for use and implemented by an adapter as shown in FIG. 1.

FIG. 2 is a diagrammatic illustration of a logical port system 50 of the present invention provided for use and implemented by an adapter 20 as shown in FIG. 1. OS partitions 16 are implemented in the system 10 as described with reference to FIG. 1. In the example of FIG. 2, there are 32 OS partitions available.

Two groups 54 and 56 of logical ports 58 are shown in FIG. 2. Logical ports 58 of the present invention are mappings of OS partitions 16 on the system 10 to physical ports 22. In the example of FIG. 2, five physical ports 22*a*, 22*b*, 22*c*, 22*d*, and 22*e* are available on the network adapter 20. These physical ports are preferably configurable as to how much bandwidth may be allocated to each of them. In the example of FIG. 2, the four physical ports 22*a-d* have been allocated 1 gigabit/second each, and the physical port 22*e* has been allocated 10 gigabits/second. Other allocations can be used in other embodiments; preferably, the end user is able to configure the bandwidth allocation as desired, within the physical limits of the network adapter 20.

Each of the logical ports 58 map a physical port 22 to one of the OS partitions 16, such that the associated OS partition "owns" that particular logical port. In the example shown, logical port 58*a* maps OS 2 in partition 16*a* to physical port 22*a*, logical port 58*b* maps OS 4 in partition 16*b* to physical port 22*a*, etc. As shown, multiple logic ports 58 can map a single OS partition 16 to one or multiple physical ports. Thus, three total logic ports 58 are shown mapping OS 4 to a total of four physical ports 22. Each physical port and the logical ports assigned to that physical port are selected by a logical switch, described below with reference to FIG. 3. Each logical port can have a separate port on the logical switch.

From the point of view of the OS running in each OS partition 16, that OS gets exclusive use of the available physical ports 22. The logical ports 58 are set up to be transparent to the OS partitions such that the OS partitions are unaware of the virtualization and organization of the logical ports, i.e., each OS partition sees each of its assigned logical ports as a physical port (the logical port does not look exactly like a physical port structure to the OS). The OS sees the queue associated with each logical port (as described with reference to FIG. 9), for example, and interacts with the resources associated with each logical port.

The logical ports 58 can be organized into port groups, such as port groups 54 and 56. The logical ports in each port group are assigned to a particular set of physical ports which they may reference; those physical ports are also considered to be in that port group. For example, the logical ports 58 in port group 54 can be assigned to physical ports 22*a-d*, and not physical port 22*e*. Likewise, the logical ports 58 in port group 56 can be assigned to physical port 22*e* and not physical ports 22*a-d*.

Each port group 54 or 56 is designated to have N logical ports available, which is a resource pool that the system manager can allocate as needs dictate when the system is configured. Each logical port can be assigned to any physical port within that port group. This allows a user, system administrator, or program to configure resources within each port group as desired, such as the distribution of the bandwidth to the physical ports within a port group, the distribution of partition access, etc. System constraints (memory, etc.) may limit the number of logical ports in each port group; for example, in the example of FIG. 2, each port group can be limited to 13 logical ports.

The use of port groups 54 or 56 allows approximately the same fixed amount of resource usage, such as bandwidth, to be allocated for each port group. For example, port group 54, which may have four 1 gigabit physical ports, can be limited to approximately the same bandwidth resources as the port group 56, which has one 10 gigabit physical port. (Other factors may also come into play to govern resource allocation, such as the number of I/O pins needed for a higher number of physical ports, e.g., for more than four 1 Gigabit ports.) Network throughput on each smaller bandwidth physical port (e.g., 1 gigabit) is preferably not as shared as much as throughput on a larger bandwidth port (e.g., 10 gigabit), to reduce bottleneck at the physical ports. Thus, in the example of FIG. 2, each 1 gigabit port 22a-d is assigned to handle up to five OS partitions in an effort to spread the OS bandwidth usage among all the four physical ports 22a-d. The single 10 gigabit physical port 22e, in contrast, is sharing bandwidth between all 13 logical ports 58 in port group 56.

Each logical port 58 can be assigned an identification value or designation, so that incoming packets can be assigned to a logical port. For example, one embodiment can assign each logical port 58 a different Media Access Control (MAC) address to identify the logical port. A MAC address is a hardware address that uniquely identifies a node in the network. Thus, each packet arriving at a physical port is assigned to a logical port having a MAC address matching the Destination (DA) MAC address in that packet.

Each logical port also can be associated with a default logical port queue and queuing processes for transmit and receive operations. This is described in greater detail below with respect to FIGS. 9 and 10.

Each logical port 58 preferably has its own set of associated resources and configuration parameters that is normally associated with each physical port 22. These resources and configuration parameters allow each logical port to perform functions as if it were a physical port. For example, each logical port 58 can have its own set of management information base (MIB) counters, which count the number of bytes and packets transmitted and received by that logical port, the number of errors of each type detected at that logical port, etc. Each logical port can have its own filter tables, allowing each logical port to independently perform filtering processes, such as filtering of types of packets based on packet type, or virtual local area network (VLAN) type, etc., using independent criteria for each logical port, and/or filtering of multicast addresses. Other filtering configurations include criteria for filtering "SNAP" frames for Ethernet, "JUMBO" (large-sized) frames, or other frame formats for packets. Configurations can include a VLAN extract configuration, that allows the extraction of a VLAN tag from a frame of an incoming packet. In addition, configurations can be set for actions that can be taken upon finding checksum errors (e.g., for IP or TCP protocols), such as allowing a packet to pass through, or no in the case that an error is found. Also, configuration resources can include enablement settings for other features of the present invention, such as per-connection queuing (described below with reference to FIG. 9).

The logical ports 58 allow multiple OS partitions to share a single set of physical ports 22 that can be provided on a single network adapter 20. With the present invention, a potentially large number of OS partitions (e.g., 25) can all have access to the network when using a much smaller number of physical ports (e.g., 5). Another advantage is the configurability of port groups, such that a group's ports can be set at, for example, 1×10 G or 4×1 G bandwidth at the physical level, without affecting the logical or level view. Thus, the OS partition view of the ports need not change when the physical port bandwidth allocation changes. In addition, the OS partitions can be assigned logical ports that can be distributed to spread out bandwidth for more efficiency and speed, i.e., each port group is limited to approximately the same bandwidth total, allowing fast communications without needing to provide a dedicated network adapter and physical port for each OS partition.

Figure 3:
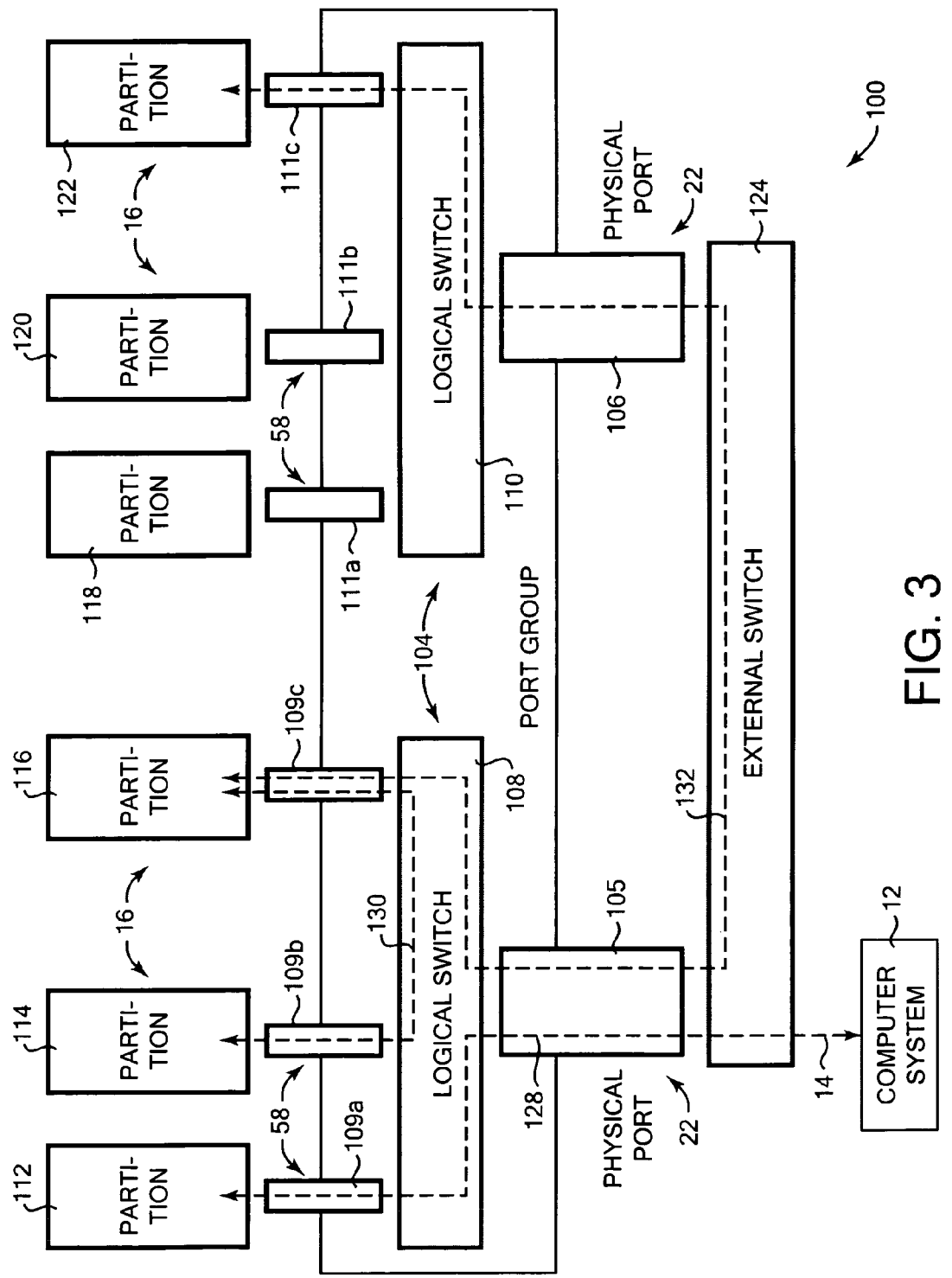
FIG. 3 is a block diagram of a communication system of the present invention including logical switches.

FIG. 3 is a block diagram of a communication system 100 of the present invention including logical switches. OS partitions 16 are provided on the server system 10 and are mapped to a port group 102 by logical ports 58. Physical ports 22 are also included in the port group 102.

The logical ports 58 are connected to associated physical ports 22 by logical switches 104. These are logical switches implemented preferably in hardware in the network adapter 20 and determine the path(s) for packets that are sent and received by the OS partitions 16. Logical ports and physical ports all become virtual ports connected to a logical switch, where the logical switch can switch to any of these virtual ports to send data through the port or receive data from the port.

As shown in FIG. 3, a logical switch 104 can be provided for each physical port 22 of the network adapter, and link that physical port to the logical ports 58 associated with that physical port 22. Thus, physical port 105 is associated with logical switch 108, which is connected to logical ports 109a-c and partitions 112, 114, and 116. Likewise, physical port 106 is associated with logical switch 110, which is connected to logical ports 111a-c and partitions 118, 120, and 122.

An external switch 124 can be coupled to the physical ports 22 to interface between the network 14 and the physical ports. This switch is a hardware component typically external to the network adapter 20 and the system 10. For example, the external switch 124 can route incoming packets to the appropriate physical port (e.g., it keeps a table of destination MAC addresses to port) and can route packets output from all physical ports to the network 14. External switch 124 can be a layer 2 or a layer 3 external switch, or handle both layers.

The logical switches 104 can not only send incoming packets to the proper OS partition 16 and send outgoing packets from the OS partitions 16 to the associated physical ports, but can also send appropriate packets from one OS partition 16 to one or more other OS partitions 16 in the same server system 10. When a packet is to be sent from one OS partition to another OS partition internally, it is referred to herein as a "wrap" path, indicating that the packet is wrapped within the server. A "non-wrap" path is one where packets are communicated between an OS partition and the external network 14. Thus, the logical switches 104 can route packets between the server system 10 and the external network, as indicated by path 128; between two OS partitions at the same logical switch 104, as shown by path 130; and between two OS partitions at different logical switches, as indicated by path 132. Path 132 shows that the path between two logical switches 18 can pass through the appropriate physical ports 22 and through external switch 124.

Figure 4:
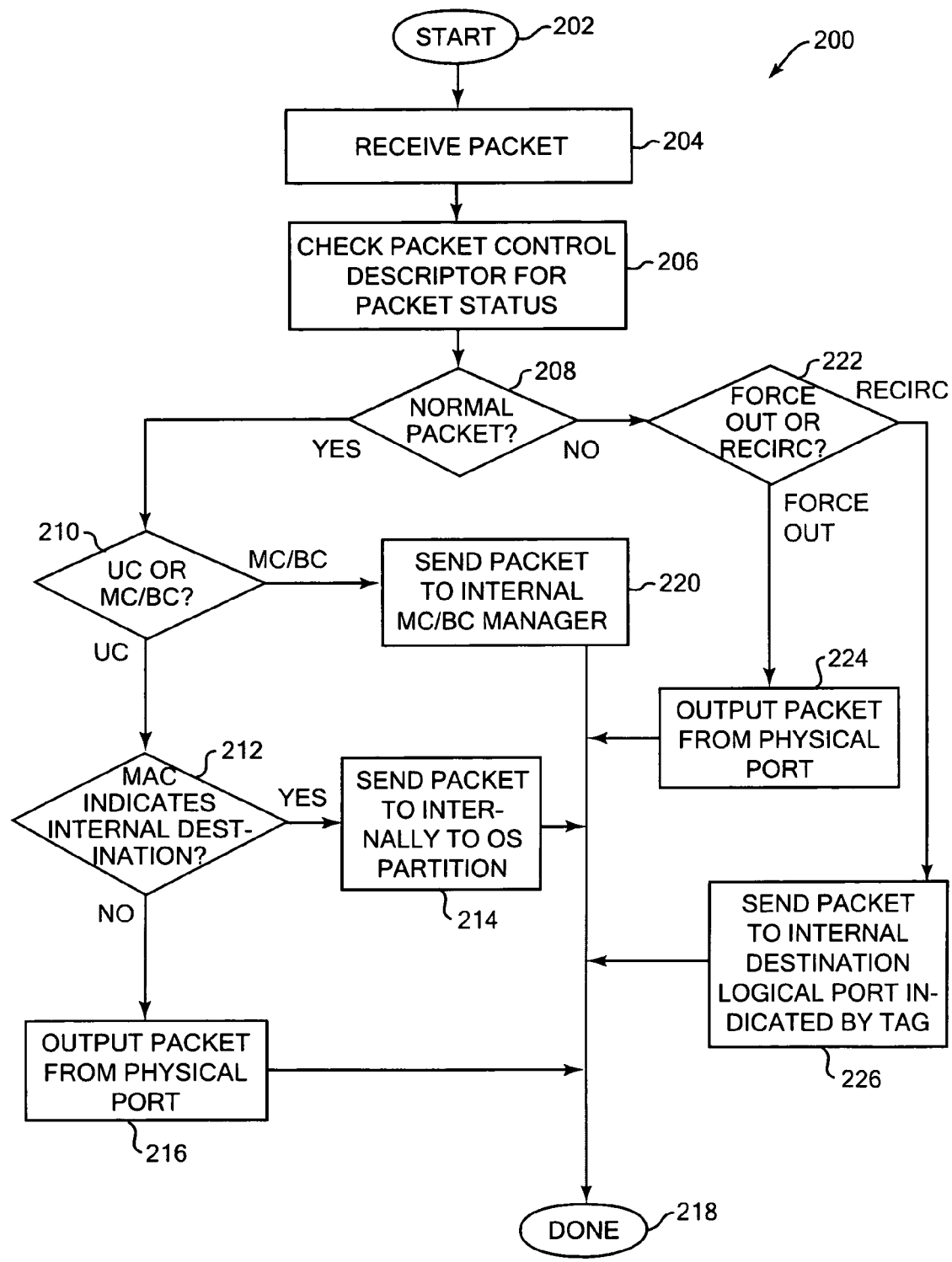
FIG. 4 is a flow diagram illustrating a method for sending packets to and from multiple operating system partitions on a computer system.

FIG. 4 is a flow diagram illustrating a method 200 for sending packets to and from multiple OS partitions on a server system. This process is from the point of view of network adapter 20 when obtaining a packet of information from an OS partition 16, from the network 14 through a physical port 22, or from the multicast/broadcast manager (described below). Thus process 200 describes packets being transmitted to the network, as well as packets being received from the network. One of ordinary skill in the art would understand that this process could be separated into two different processes, one for transmission of packets to the network 14, and one for receiving packets from the network and from a wrap path. The method is preferably implemented in hardware, such as logic circuitry and gates, processor, etc., but can alternatively be implemented in software, or a combination of software and hardware.

The method begins at 202, and in step 204, a packet is obtained at the network adapter 20. In one scenario, the packet was obtained from an OS partition 16 or multicast/broadcast manager of the server system (described below) for transmission across the network 14 or to another OS partition 16. In another scenario, the packet was obtained (received) from the network 14 from a computer system 12 or other device, through a physical port 22 of the network adapter.

In step 206, the process checks a packet control descriptor obtained with the received packet to determine a status of the packet. In the described embodiment, the packet control descriptor can have one of three possible values, each indicating a different status for the packet. One value indicates that the packet has a "normal" status, i.e., it is a packet that has not been modified for use with the present invention. This type of packet is normally sent out by OS partitions 16 or sent/received over the network 14. A second value indicates that the packet has a "force out" status, i.e., it is a packet that has been modified for use with the present invention (as detailed in FIG. 5) to automatically be sent out a physical port 22 of the network adapter. A third value indicates that the packet has a "recirculate" status, i.e., it is a packet that has been modified (as detailed in FIG. 5) to automatically be wrapped to an OS partition 16 within the server system 10.

In step 208, the process determines whether the packet has a normal status or a non-normal status. If it is a normal packet, the process continues to step 210, in which the process checks whether the packet is a unicast (UC) packet, or a multicast (MC)/broadcast (BC) packet. As is well known, a unicast packet has a single designated destination, a multicast packet has multiple designated destinations, and a broadcast packet is to be sent to all available destinations. If it is a UC packet, the process continues to step 212, in which the process checks whether the destination (DA) MAC address of the packet indicates whether the packet should be sent to an internal destination, such as OS partition 16 of the server system 10, or transmitted out to the network via a physical port 22. The destination of the packet can be determined from this MAC address. Each logical port 58 of the system 10 has been assigned a MAC address; thus, on reception of a packet from the network via a physical port 22, the DA MAC of the obtained packet is compared against each MAC of each logical port of the logical switch associated with the physical port that received the packet.

If the packet is to be sent to an internal destination, the process continues to step 214, in which the packet is sent, e.g., internally to the OS partition 16 at the logical port having the destination address MAC found in the packet. As described above, the destination MAC address is used to find the logical port 58 having that same MAC address that is mapped to the desired OS partition. When the packet is on a wrap path, i.e., it was obtained from an OS partition or the MC/BC manager and sent to a different OS partition, the packet is injected into the receive side demultiplexing logic of the network adapter 20 as though the packet had been received on the line from the network and physical port. The process is then complete at 218.

If the packet is not sent internally in step 212, i.e., the packet is to be transmitted on the network, then in step 216, the packet is output from the appropriate physical port 22 to be sent to a destination over the network 14. As described above, the packet is sent out through a physical port 22 that is associated with the port group including the logical port of the OS partition from which the packet was obtained in step 204. The process is then complete at 218.

If the packet was found to be a multicast or broadcast (MC/BC) packet in step 210, then the process continues to step 220, in which the packet is sent from the network adapter 20 to an internal MC/BC manager of the server system 10. If an OS partition 16 provided the packet in step 204, the packet is sent on a wrap path to the receive-side demultiplexing logic of the network adapter 20 as though the packet had been received on the line from the network and follows the demultiplex flow to the MC/BC manager. The MC/BC manager can be a software process provided on the server system 10 and may be slower than using hardware, but since MC or BC packets are typically a small percentage of all network traffic, this does not significantly degrade system performance. The process of the MC/BC manager when receiving a packet is described below with reference to FIG. 5.

If in step 208 the received packet was found to not have a normal status, then the packet was obtained from the MC/BC manager. The MC/BC manager has modified the status of a packet sent to it in a previous iteration of step 220 by changing its packet control descriptor, or has created a duplicate packet with a non-normal status, as described below with reference to FIG. 5. The process 200 checks the packet control descriptor in step 222 to determine whether the received non-normal packet has a status of "force out" or "recirculate." If the packet is a force out packet, the process continues to step 224, in which the packet is transmitted out to the network 14 via a physical port to be sent to destinations indicated by its multicast/broadcast MAC address, i.e., this packet has been designated by the MC/BC manager to be sent externally. The process is then complete at 218.

If the packet is a recirculate packet at step 222, then the process continues to step 226, in which the packet is sent to an internal logical port that is indicated by a destination tag accompanying the packet (the tag is preferably separate from the packet). The tag and the packet control descriptor are passed with the wrapped packet along an internal wrap path to the receive side demultiplexing logic. The destination tag was added by the MC/BC manager to the packet to provide a pointer to an internal logical port 58 to which the packet is to be routed, and the adapter 20 thus ignores the packet's DA MAC address in this step and routes the packet to the OS partition at the logical port designated in the tag. The process is then complete at 218. The use of the destination tag in the present invention allows the original DA MAC address of the packet to remain in the packet unmodified, thereby allowing the packet's DA MAC address to be used by any other later network processes that require it, a significant advantage of the current implementation.

Figure 5:
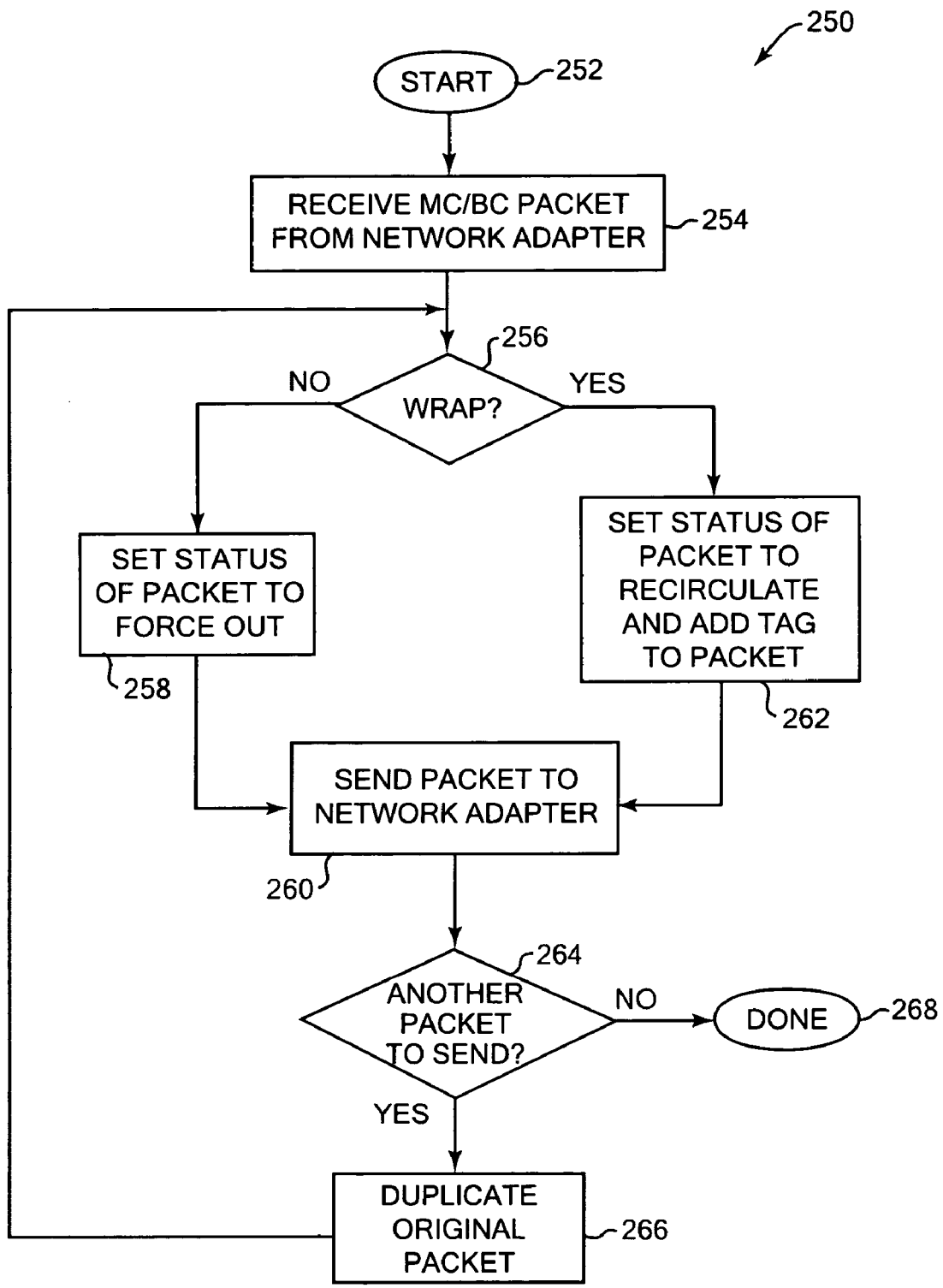
FIG. 5 is a flow diagram illustrating a method of the present invention for managing multicast or broadcast packets for distribution from or within a computer system.

FIG. 5 is a flow diagram illustrating a method 250 of the present invention for managing multicast or broadcast packets for distribution from or within the server system 10. This method is preferably performed by a MC/BC manager (shown in FIG. 7) which is implemented in software of the server system 10 and which can interface with the network adapter 20.

The method begins at 252, and in step 254, a MC/BC packet is received by the MC/BC manager from the network adapter 20. The MC/BC packet was sent to the manager by the adapter in step 220 of method 200 of FIG. 4. A multicast or broadcast packet has a MAC address indicative of this MC or BC status for the packet. In step 256, the process checks whether this packet is to be wrapped to an OS partition 16 of the system 10 in which the MC/BC manager resides. Since MC or BC packets are to be sent to multiple destinations, the manager can check all of the destinations. In this determination, the MC/BC manager checks whether any remaining OS partitions need to receive the packet or a duplicate of the originally received packet. A broadcast packet will always need to be wrapped as well as output from a physical port to available destinations over the network 14; either the wrapping or the external transmission can be performed first, as desired (duplicated packets will eventually be sent to all destinations, as described below). A multicast packet may need to be wrapped to one or more internal OS partitions, and/or transmitted to external destinations, depending on the designated destinations provided by the multicast MAC (MC destinations are determined using a maintained database of partitions registered for a particular MC address).

The manager will always send out a packet to be transmitted to the network if the packet it received was originated internally by an OS partition 16. The transmit side logic of the adapter 20 provided the packet to the manager. The manager knows it was originated internally by comparing the source MAC of the packet to the internal MACs of the system 10 and finding a match; in this case, the manager will always send a packet out a physical port, and that packet's particular external destinations are determined later (e.g., by the external switch; the manager is internal to system 10 and does not know which particular external destinations should receive a multicast packet). However, if the manager does not match the source MAC of the packet to one of the internal MACs of the system 10, it knows it was received from the network 14 and through the receive side demultiplexing logic of the adapter 20, and it will not send out any packets to be transmitted to the external network.

If no wrapping is to be performed for this copy of the packet, the process continues to step 258, in which the manager sets the status of the packet to "force out" by writing the appropriate value in the packet control descriptor of the packet. The process then continues to step 260, in which the manager sends the packet to the network adapter 20. The network adapter receives the packet in step 204 of method 200, as described above, and sends it out a physical port 22.

If wrapping is to be performed for this packet, the process continues to step 262, in which the manager sets the status of the packet to "recirculate" by writing the appropriate value in the packet control descriptor of the packet. In addition, the manager adds a recirculate tag to accompany the packet, where the tag includes a designation of the logical port to which the packet is to be sent. This allows the network adapter 20 to route a recirculated packet to a logical port by reading different information than the MAC address, thus allowing the original multicast MAC address of the packet to remain without modification. The process then continues to step 260, in which the manager sends the packet (and tag) to the network adapter 20.

After step 258 or step 262, step 264 is performed, in which the process checks whether there is another copy of the packet to send. Since multicast and broadcast packets are to be sent to multiple destinations, the MC/BC manager determines which destinations are designated, and checks at this step if any destinations have not yet been sent a duplicate of the packet. If there is another packet to send, then in step 266, the manager duplicates the originally-received packet, and the process returns to step 256 to modify the duplicated packet accordingly before sending it to the network adapter 20 for proper routing. If there are no more duplicate packets needed to be sent at step 264, the process is complete at 268. In the described embodiment, the MC/BC manager does not need to duplicate force out packets, since the external switch 124 can duplicate packets to be sent to external destinations on the network.

It should be noted that in other embodiments, the described steps can be performed in a different order in the process 250 than is shown. For example, the manager can create duplicates of the received packet and keep all duplicated packets in a buffer until all are prepared via steps 258 and/or 262, and then send them all at once to the network adapter in a step similar to step 260.

Figure 6:
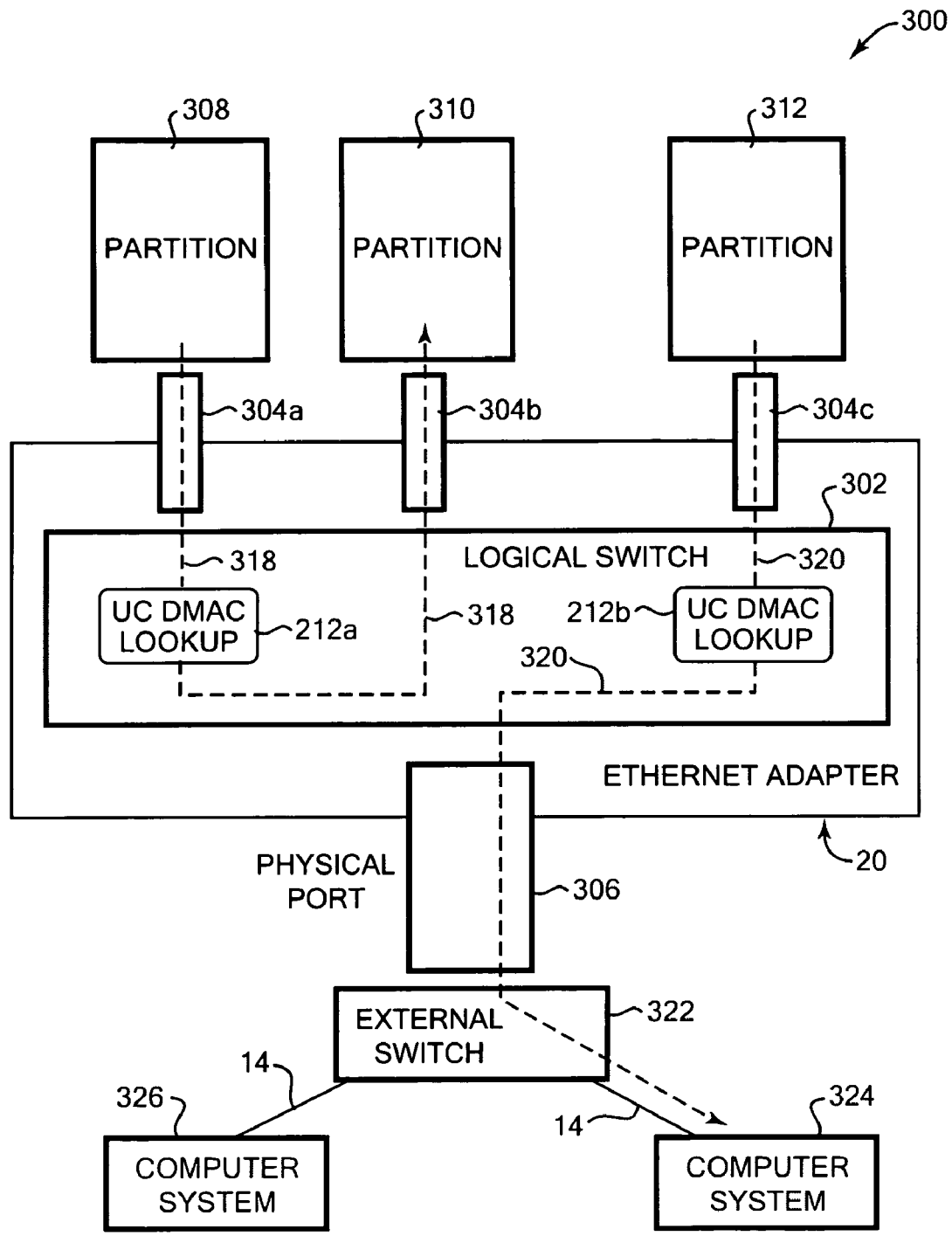
FIG. 6 is a block diagram of a communication system of the present invention including logical switches.

FIG. 6 is a block diagram of a system 300 of the present invention illustrating unicast (UC) packet flow as described above with reference to FIG. 4. Network adapter 20, shown as an Ethernet adapter, includes logical switch 302 that references logical ports 304a-c and physical port 306. OS partitions 308, 310, and 312 are coupled to the logical ports 304a-c. In one example, the partitions 308, 310, and 312 can be on the same subnet as the computer systems 324 and 326 on network 14. For example, partition 308 could have a MAC address of 11 and a TCP/IP address of 9.1.1.1, partition 310 can have a MAC of 12 and a TCP/IP address of 9.1.1.2, partition 312 can have a MAC of 13 and a TCP/IP address of 9.1.1.3, computer system 324 can have a MAC of 31 and a TCP/IP address of 9.1.1.13, and computer system 324 can have a MAC of 41 and a TCP/IP address of 9.1.1.14.

In an example of wrapping a packet transmitted by an OS partition, the partition 308 sends a normal, unicast packet out on path 318, and the packet is subject to a UC destination MAC address lookup process 212a once it is received by the logical switch 302 of the network adapter 20. The UC MAC lookup is described in step 212 of FIG. 4 above. The MAC lookup indicates that the packet should be wrapped, so the packet is sent by the logical switch to continues on path 318 to a destination, which is OS partition 310 via logical port 304b. A similar process would occur in the reverse direction, if partition 310 issued a normal unicast packet having a destination of partition 308.

In a different example of a non-wrap packet transmission or reception, partition 312 sends out a normal UC packet on path 320, and the packet is similarly subject to a UC destination MAC address lookup process 212b once it is received by the logical switch 302. The MAC lookup indicates that the packet should be sent out externally, so the logical switch sends the packet on path 320 through the physical port 306, through an external switch 322, and to a destination computer system 324. A similar process would occur in the reverse direction, if computer system 324 issued a normal unicast packet that was received through physical port 306 by the network adapter 20; the packet would be subject to DA MAC lookup at the logical switch and provided through a logical port to its destination, e.g., logical port 304c to partition 312.

Figure 7:
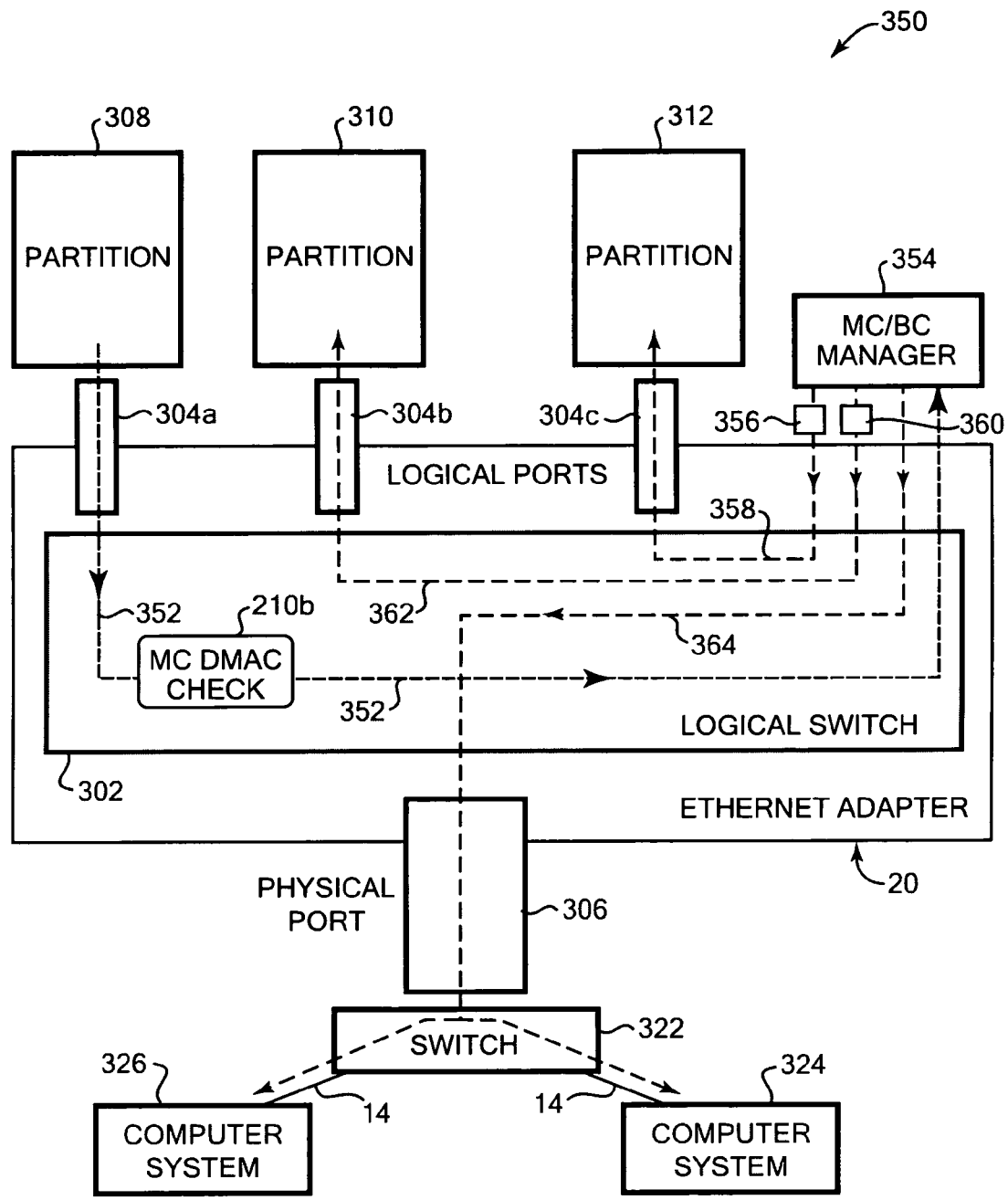
FIG. 7 is a block diagram of a communication system of the present invention including logical switches.

FIG. 7 is a block diagram of a system 350 of the present invention illustrating multicast/broadcast (MC/BC) packet outbound flow (transmission) as described above with reference to FIGS. 4 and 5. Network adapter 20, shown as an Ethernet adapter, includes logical switch 302 that references logical ports 304a-c and physical port 306. OS partitions 308, 310, and 312 are coupled to the logical ports 304a-c. In one example, the partitions 308, 310, and 312 can be on the same subnet as the computer systems 324 and 326 on network 14, similarly as described above for FIG. 6.

In this example, outbound flow of a packet is provided from an OS partition to other destinations. The partition 308 sends a normal, MC or BC packet out on path 352, and the packet is subject to a MC destination MAC address check 210a once it is received by the logical switch 302, as described in step 210 of FIG. 4 above. The MAC check indicates that the packet is an MC or BC packet, so the packet is sent on path 352 to the MC/BC manager 354 implemented in the server system 10.

The MC/BC manager 354 determines the destinations of the packet, makes duplicate packets, changes the packet descriptors, and adds recirculation tags as described above with reference to FIG. 5. In this example, the manager 354 has determined it is a MC packet having three destinations, and that four packets are to be sent out: two wrapped to OS partitions, and two sent to external destinations. Thus, manager 354 sends out a recirculate MC packet and a recirculate tag 356 on path 358 to the adapter 20, which reads the tag 356 to find logical port 304c and wraps the packet to partition 312. Similarly, the manager 354 sends out a recirculate MC packet and a recirculate tag 360 on path 362 to the adapter 20, which reads the tag 360 to find logical port 304b and wraps the packet to partition 310. The manager 354 also sends out a force-out MC packet on path 364 to the adapter 20, which sends these packets out the physical port 306 and through external switch 322. The external switch 322 replicates the packet so that one is provided to external computer system 324 and one is provided to external computer system 326 across network 14.

Figure 8:
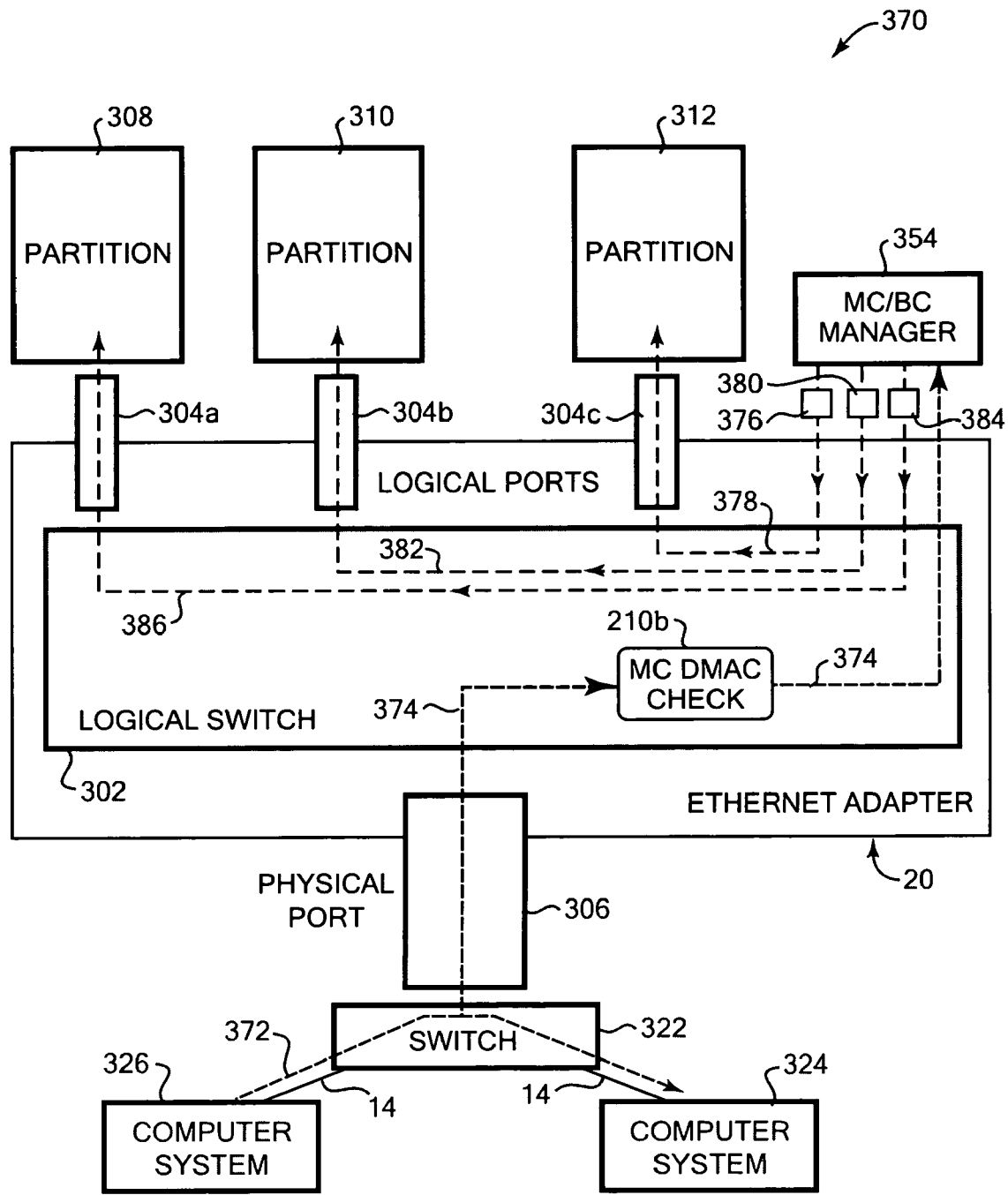
FIG. 8 is a block diagram of a communication system of the present invention including logical switches.

FIG. 8 is a block diagram of a system 370 of the present invention illustrating multicast/broadcast (MC/BC) packet inbound flow (reception) as described above with reference to FIGS. 4 and 5. Network adapter 20, shown as an Ethernet adapter, includes logical switch 302 that references logical ports 304a-c and physical port 306. OS partitions 308, 310, and 312 are coupled to the logical ports 304a-c. Similarly as above, in one example, the partitions 308, 310, and 312 can be on the same subnet as the computer systems 324 and 326 on network 14.

In this example, inbound flow of a packet from an external destination, such as computer system 326, is provided to internal OS partitions. Computer system 326 sends a normal MC or BC packet out on path 372, and external switch 322 sends one copy of the packet to other destinations on network 14 if appropriate, such as to external computer system 324. The switch 322 sends another packet copy to the system 10 through physical port 306, and the packet is routed to the logical switch on path 374. The packet is subject to a MC destination MAC address check 210a once it is received by the logical switch 302, as described in step 210 of FIG. 4 above. The MAC check indicates that the packet is an MC or BC packet, so the packet is sent on path 374 to the MC/BC manager 354.

The MC/BC manager 354 determines the destinations of the packet, makes duplicate packets, changes the packet descriptors, and adds recirculation tags as described above with reference to FIG. 5. In this example, the manager 354 has determined it is a MC packet having three internal destinations, and that three packets are to be sent to internal OS partitions. Thus, manager 354 sends out a recirculate MC packet and a recirculate tag 376 on path 378 to the adapter 20, which reads the tag 378 to find logical port 304c and wraps the packet to partition 312 (a path from manager 354 to an internal OS partition is also considered a "wrap"). Similarly, the manager 354 sends out a recirculate MC packet and a recirculate tag 380 on path 382 which gets wrapped to logical port 304b and partition 310, and a recirculate MC packet and a recirculate tag 384 on path 386 which gets wrapped to logical port 304a and partition 308.

Figure 9:
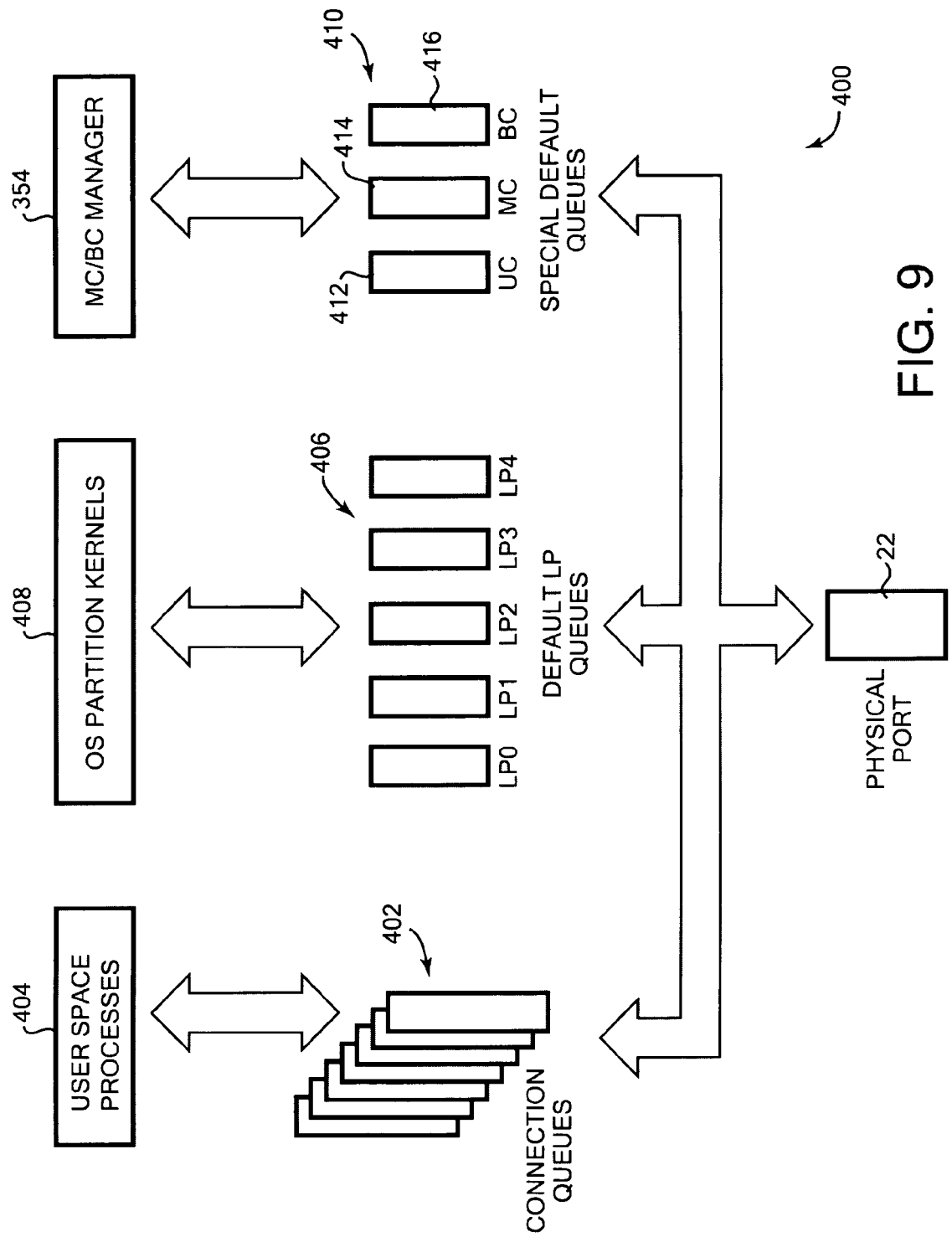
FIG. 9 is a diagrammatic illustration of a queuing system of the present invention for queuing network packets.

FIG. 9 is a diagrammatic illustration of a queuing system 400 of the present invention for queuing network packets. The server system 10 can include a set of queues for holding packets that are to be received by OS partition kernels, or received directly by applications/processes within user spaces of each OS partition, and for holding packets that are to be transmitted by the partitions or user space processes to physical ports 22. The queues described below can be implemented in the main memory of the system 10 which can be accessed both by the network adapter 20 to store packets in the queues, and by the protocol stacks and device drivers to retrieve packets from the queues.

The first type of queue included in system 400 are connection queues 402. These queues provide buffers for packets being sent to processes 404 in user spaces of the server system, and are buffers for packets being sent from processes 404 to destinations such as other processes, OS partitions, or external computer systems across a network. User spaces are software spaces in an OS partition that provide processes in which applications run, and the applications communicate with the network 14 by network connections. Some or all of the TCP/IP stack that traditionally runs in the kernel of the OS is migrated to each user space and has its own connection queue. This allows efficiency, since the kernel can be bypassed for many TCP/IP send and receive operations. Each network connection to a process/application in user space 404 has its own connection queue 402 for storing the packets. For example, when a TCP/IP packet is received, a TCP/IP stack process can look up the connection information in a connection direct table to find a connection queue number, so that the received packet can be placed in the appropriate connection queue and processed eventually by the stack. Information processed from the packets in the queue is sent to processes (e.g., an application in each process) in user spaces. A received packet is directed to the correct queue by hardware in network adapter 20 (described in related patent application entitled, "Host Ethernet Adapter for a Networking Offload in a Server Environment", application Ser. No. 11/097,608, filed on Apr. 1, 2005), and then the TCP stack in the user space takes over control to access the queue.

In one example, connection queues can be best suited for long-lived connections where fragmentation of the IP packets is not expected and for which low-latency is expected. The user space application or process can utilize a user-space sockets library which supports a connection queuing mechanism provided by the network adapter 10.

A second type of queue included in system 400 are default logical port (LP) queues 406. These queues provide buffers for packets being sent to the kernels 408 of OS partitions 16 of the server system 10. Each OS partition 16 is provided with its own default LP queue 406, such that each default LP queue can be associated with a single logical port 58 that is associated with the desired OS partition. Thus, each logical port corresponds to a logical Ethernet interface with its own default queue. Typically, the packets in the default LP queues are handled and processed by the kernels 408 of the associated operating systems, i.e., the kernel networking stack of an operating system handles the default queue 406 for that operating system. In the present invention, the default LP queues 406 store packets when no connection queue 402 can be found for the packet, if per-connection lookup is not enabled for the MAC address of the packet (per-connected lookup enablement can be one of the logical port configuration resources that can be configured by the system manager or operator), or if the packet is a recirculated multicast/broadcast packet, as described in greater detail below with respect to FIG. 10.

Each of the default LP queues 406 (and the special default queues 410, described below) can be assigned attributes, similarly to the way that logical ports 58 can be assigned attributes as described above with respect to FIG. 2. For example, filtering for each queue can be enabled or disabled. Attributes can have the same format for configuration to allow easier packet management. Some hardware logic can also be shared since the configuration is the same between the queue types.

A third type of queue included in system 400 are special default queues 410. These queues are used to store packets which are not stored in the other available queues. In the present invention, three special default queues are provided: a unicast default queue 412, a multicast default queue 414, and a broadcast default queue 416. The unicast default queue 412 stores packets when no default LP queue 406 can be found for the packet. The multicast default queue 414 and broadcast default queue 416 store multicast and broadcast packets, respectively, which do not match one of the MAC addresses in the MAC lookup table (located in hardware in the network adapter 20), or which are recirculated. These are described in greater detail below with respect to FIG. 10.

Each type of queue listed above is preferably associated with each physical port provided on the network adapter 20. Thus, each physical port preferably has a set of connection queues 402, a set of default LP queues 406 associated with the logical ports 58 for that physical port, and a set of special default queues 410.

Figure 10:
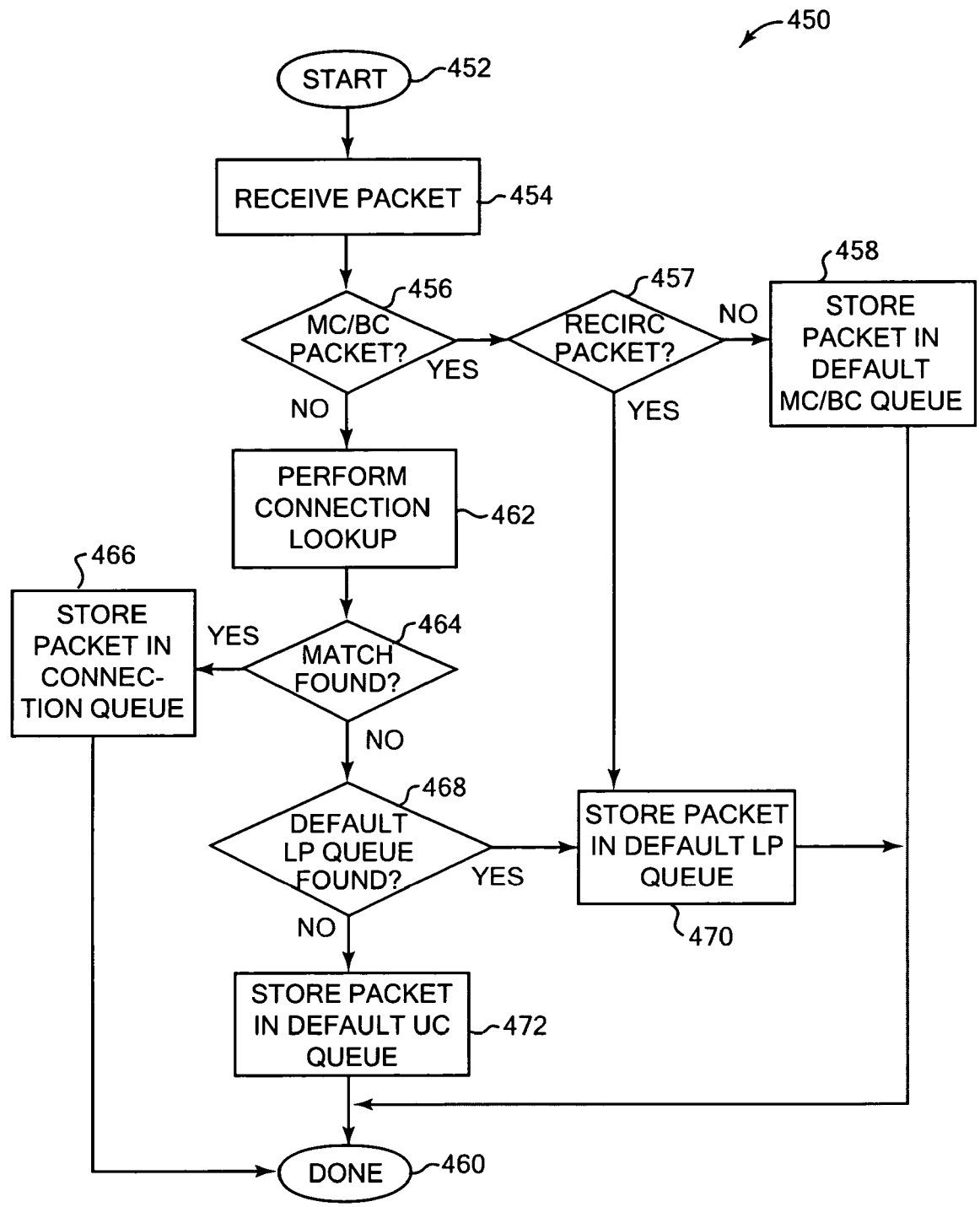
FIG. 10 is a flow diagram illustrating a method of the present invention for selecting a queue for packet storage.

FIG. 10 is a flow diagram illustrating a method 450 of the present invention for selecting a queue for packet storage. This method is implemented by hardware on the network adapter 20 for a packet received either from the network 14 or on a wrap path. Alternatively it can be implemented in software and/or in a different component of the server system 10.

The method begins at 452, and in step 454, a packet is received by the network adapter from the network 14 or via an internal wrap path. In step 456, the process checks whether it is a recirculated packet, i.e., a packet that has been designated for a wrap-path by the MC/BC manager 354 as described above with reference to FIGS. 4 and 5. Recirculated packets have already been treated by the manager and thus can be sent to their destination; thus, if it is a recirculated packet, the process continues to step 470 to store the packet in a default LP queue, as described below. If it is not a recirculated packet, then in step 457 the process checks whether the packet is a unicast (UC) packet or a multicast (MC)/broadcast (BC) packet. This can be determined from the MAC address of the packet, for example. If it is an MC/BC packet, in step 458 the process stores the packet in the special default MC/BC queue 414 or 416, respectively, that is associated with the physical port that received the packet. The process is then complete at 460. Packets in the default MC and BC queues 414 and 416 are eventually provided to the MC/BC manager 354 for processing, as described above with respect to FIG. 5. If the packet has arrived on a physical port that is dedicated to a single OS partition, then the packets in the MC and BC queues can be provided to a central OS queue, e.g., the default LP queue 406 for that partition.

If the packet is a UC packet as determined in step 457, then the process continues to step 462, in which a connection lookup is performed. (In one implementation, a MAC address lookup for logical ports can also be performed, even if storing in a connection queue, e.g., a 6-tuple lookup can be performed, where the $6^{th}$ tuple is the logical port number; this allows the same 5-tuple connection information to appeal on each logical port 58 and not overlap). In the described embodiment, the hardware on the adapter 20 takes the 2-tuple, 3-tuple, or 5-tuple pattern of connection information in the packet and tries to match that pattern with connection information stored in the connection table when the connection was made available or established. One embodiment of such a method is described in the copending patent application entitled "Method and Apparatus for Providing a Network Connection Table", application Ser. No. 11/097,571, filed Apr. 1, 2005, which is incorporated herein by reference in its entirety.

In next step 464, the process checks whether a match for the connection lookup was found, e.g., if a matching pattern of connection information was found in the connection table. If so, then the process stores the packet in the connection queue associated with the matching connection. For example, a number or pointer referencing the desired connection queue can be stored in a connection table with the matching connection information. The packet can eventually be processed from the connection queue and provided to the appropriate process 404 in the user space. The process is then complete at 460.

If no matching pattern was found for the packet in step 464 (or if per-connection queuing is not enabled for the MAC address in the packet), then the process checks in step 468 whether a default LP queue is found for the packet. As described above, each logical port 58 has an associated default LP queue 406. The default queue is determined by performing a lookup for the destination MAC address in the packet in a list or table of logical port MAC addresses (each logical port 58 is assigned a MAC address, as described above). Thus, if a logical port's MAC address matches the destination MAC address in the packet in this step, then the process stores the packet in that logical port's default LP queue 406 in step 470, and the process is complete at 460. Packets in the default LP queues 406 are routed to the kernel networking stacks of the OS partitions 16 associated with those queues.

If no default LP queue 406 is found for the packet, then the process continues to step 472 to store the packet in the special default UC queue 412 associated with the physical port that received the packet (if the special queue 412 is enabled), and the process is complete at 460. A packet may not be intended for any of the MAC addresses and logical ports 58 of the system 10, and so that packet will not match any of the configured logical port MAC addresses; thus it can be stored in the default queue 412. For example, this may occur if the system is in a "promiscuous mode" or has a "sniffer" function in which every data packet transmitted can be received and read by the network adapter, e.g., to monitor network activity, so that packets for other destinations are analyzed as well as packets intended for the system 10. Or, this may occur if a network bridging function is being implemented by the system 10, where the network 14 is connected to another network, and each packet is analyzed to determined whether it is to be passed to destinations within the network 14, or forwarded to destinations known to be on another interconnected network.

The default UC queue 412 is optional, so that in other embodiments, or if the queue 412 is disabled, step 472 is not performed; rather, if no default LP queue was found for the packet, the packet is discarded. For example, the special queue 412 might be disabled if a "promiscuous mode" is disabled.

The method 450 of the present invention allows for flexibility between the two extremes of queuing per connection and queuing per logical port (OS queue). In the present invention, both models can operate together with some connections having their own queuing and some connections being queued with the default logical port queues. The method 450 also provides for multiple OS partitions and supports layer 2 switching of Ethernet between partitions, including multicast/broadcast packets (e.g., IEEE 802.3).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for distributing network communications on a computer system, the method comprising:
    receiving a data packet at a logical switch in the computer system, wherein the data packet includes a packet control descriptor the packet control descriptor comprising a packet status wherein the packet status comprises a normal status, a force out status wherein the force out status indicates that the data packet has been modified to automatically be sent out to a physical port or a re-circulate status wherein the re-circulate status is a status whereby the packet has been designated for a wrap path, the computer system running multiple operating system partitions;
    wrapping the data packet from one operating system partition of the computer system to another operating system partition of the computer system through a hardware path internal to the computer system when information in the packet indicates a wrap path; and
    sending the data packet received from an operating system partition to a physical port coupled to an external network, or received from the external network to an operating system partition, when information in the data packet indicates a non-wrap path.

2. The method of claim 1 wherein the computer system includes at least one physical port coupled to the external network, and wherein each operating system partition has one or more logical ports for sending and receiving data, such that the logical ports and an associated physical port act as virtual ports which are selected by the logical switch to send the data packet therethrough.

3. The method of claim 1 wherein the information in the data packet includes a destination address and a packet control descriptor.

4. The method of claim 3 wherein the data packet is one of a unicast packet, a multicast packet, and a broadcast packet.

5. The method of claim 4 wherein if the data packet is a unicast packet, the destination address of the data packet is checked to determine whether to send the data packet to an internal operating system partition or to a destination on the external network.

6. The method of claim 4 wherein if the data packet is a multicast packet or a broadcast packet, the data packet is sent to a multicast/broadcast manager implemented on the computer system.

7. The method of claim 6 wherein the multicast/broadcast manager duplicates the data packet for any additional destinations for the packet, and changes the packet control descriptor for the data packet and for any duplicated data packets to indicate that they have been processed by the multicast/broadcast manager, and outputs the data packet and any duplicated data packets such that they are sent to appropriate destinations of the computer system and the external network.

8. The method of claim 7 wherein if a data packet received by the multicast/broadcast manager is to be sent to an operating system partition of the computer system, the multicast/broadcast manager adds a tag to the data packet indicating the particular operating system partition to which to send the data packet.

9. The method of claim 6 wherein if the received data packet is a multicast packet or a broadcast packet and the packet control descriptor indicates the data packet is a force out packet as designated by the multicast/broadcast manager, the data packet is sent to a destination on the external network.

10. The method of claim 6 wherein if the received data packet is a multicast packet or a broadcast packet and the packet control descriptor indicates the data packet is a recirculate packet as designated by the multicast/broadcast manager, the data packet is sent to an operating system partition of the computer system as indicated by a tag associated with the data packet and provided by the multicast/broadcast manager.

11. A method for providing network communications for a computer system, the method comprising:
    receiving a data packet at a network adapter wherein the data packet includes a packet control descriptor the packet control descriptor comprising a packet status wherein the packet status comprises a normal status, a force out status wherein the force out status indicates that the data packet has been modified to automatically be sent out to a physical port or a re-circulate status;
    checking whether the data packet is a re-circulated packet, wherein a re-circulated packet is a packet that has been designated for a wrap path;
    storing the data packet in one of a plurality of connection queues, the connection queues for storing data packets that are to be sent from or received by at least one process in at least one user space of the computer system via associated network connections; and
    storing the data packet in a default operating system queue if no network connection can be found for the data packet, the default operating system queue for storing data packets that are to be sent from or received by a kernel of an operating system partition implemented by the computer system.

12. The method of claim 11 wherein the network connections are provided between the at least one process and a network, wherein at least one physical port of the computer system is coupled to the network, the at least one physical port allowing communications between the network and the computer system.

13. The method of claim 11 wherein the computer system provides multiple operating system partitions and a logical port associated with each of the operating system partitions, wherein each logical port has an associated default operating system queue such that data packets stored in a default operating system queue are to be sent from or received by a kernel of the associated operating system partition.

14. The method of claim 11 further comprising storing the data packet in a special default queue if the data packet cannot be stored in a connection queue or default operating system queue.

15. The method of claim 11 further comprising storing the data packet in a special multicast or broadcast default queue if the data packet is a multicast or broadcast packet, respectively.

16. The method of claim 15 wherein the data packets in the multicast and broadcast special default queues are provided to a multicast/broadcast manager implemented on the computer system, wherein the multicast/broadcast manager duplicates the data packet and outputs the data packet and duplicate data packets to be sent to a plurality of destinations.

17. The method of claim 11 wherein at least one process in the user space has a plurality of network connections and is serviced by the connection queues associated with those network connections.

* * * * *